(12) United States Patent
Dibon et al.

(10) Patent No.: US 8,197,907 B2
(45) Date of Patent: Jun. 12, 2012

(54) METHOD AND INSTALLATION FOR COATING A METAL STRIP WITH A COATING CONTAINING A SOLVENT AND FOR DRYING AND/OR CROSS-LINKING SAID COATING

(75) Inventors: Andreas Dibon, Neustetten (DE); Kai Baer, Bad Aibling (DE)

(73) Assignee: Value & Intellectual Properties Management GmbH (DE)

( * ) Notice: Subject to any disclaimer, the term of this patent is extended or adjusted under 35 U.S.C. 154(b) by 545 days.

(21) Appl. No.: 11/792,892

(22) PCT Filed: Dec. 5, 2005

(86) PCT No.: PCT/EP2005/012989
§ 371 (c)(1),
(2), (4) Date: Oct. 5, 2007

(87) PCT Pub. No.: WO2006/063705
PCT Pub. Date: Jun. 22, 2006

(65) Prior Publication Data
US 2008/0206475 A1  Aug. 28, 2008

(30) Foreign Application Priority Data
Dec. 13, 2004 (DE) .......................... 10 2004 059 903

(51) Int. Cl.
*B05D 3/00* (2006.01)
*B05B 5/00* (2006.01)
(52) U.S. Cl. ........ 427/444; 427/282; 427/542; 427/294; 427/553; 427/569; 118/642; 118/400; 118/50; 118/641; 118/724; 34/480; 34/523; 34/540; 34/543; 34/641

(58) Field of Classification Search .................. 427/444, 427/282, 542, 294, 553, 569; 118/642, 400, 118/50, 641, 724, 314; 34/156, 41, 68, 4, 34/155, 160, 480, 523, 540, 543, 641
See application file for complete search history.

(56) References Cited

U.S. PATENT DOCUMENTS
| | | | | |
|---|---|---|---|---|
| 5,092,059 A | * | 3/1992 | Wimberger et al. | ............ 34/641 |
| 6,401,358 B1 | | 6/2002 | Bar et al. | |
| 2002/0004994 A1 | * | 1/2002 | Rudd | .............................. 34/343 |

FOREIGN PATENT DOCUMENTS
| | | |
|---|---|---|
| DE | 37 44 799 A1 | 6/1989 |
| DE | 198 07 643 A1 | 9/1999 |
| DE | 202 02 512 U1 | 8/2002 |
| DE | 101 58 008 A1 | 6/2003 |

* cited by examiner

*Primary Examiner* — Nadine G Norton
*Assistant Examiner* — Mahmoud Dahimene
(74) *Attorney, Agent, or Firm* — Factor Intellectual Property Law Group, Ltd.

(57) ABSTRACT

The invention relates to a method for coating a metal strip with a coating containing a solvent and for drying and/or cross-linking said coating. Accordingly, the metal strip is provided with the coating in an inner chamber of a coating device. The coated metal strip is conducted through a drying unit and in an inner chamber of the latter is exposed to a form of energy by at least one radiation source that is cooled by a cooling gas, said form of energy being converted to heat in the coating and/or the metal strip. The cooling gas that is supplied to the radiation source flows through the latter, absorbs the waste heat from said source and is then conducted into the inner chamber of the drying unit, thus saving energy and gas. The invention also relates to an installation that is suitable for carrying out said method.

15 Claims, 1 Drawing Sheet

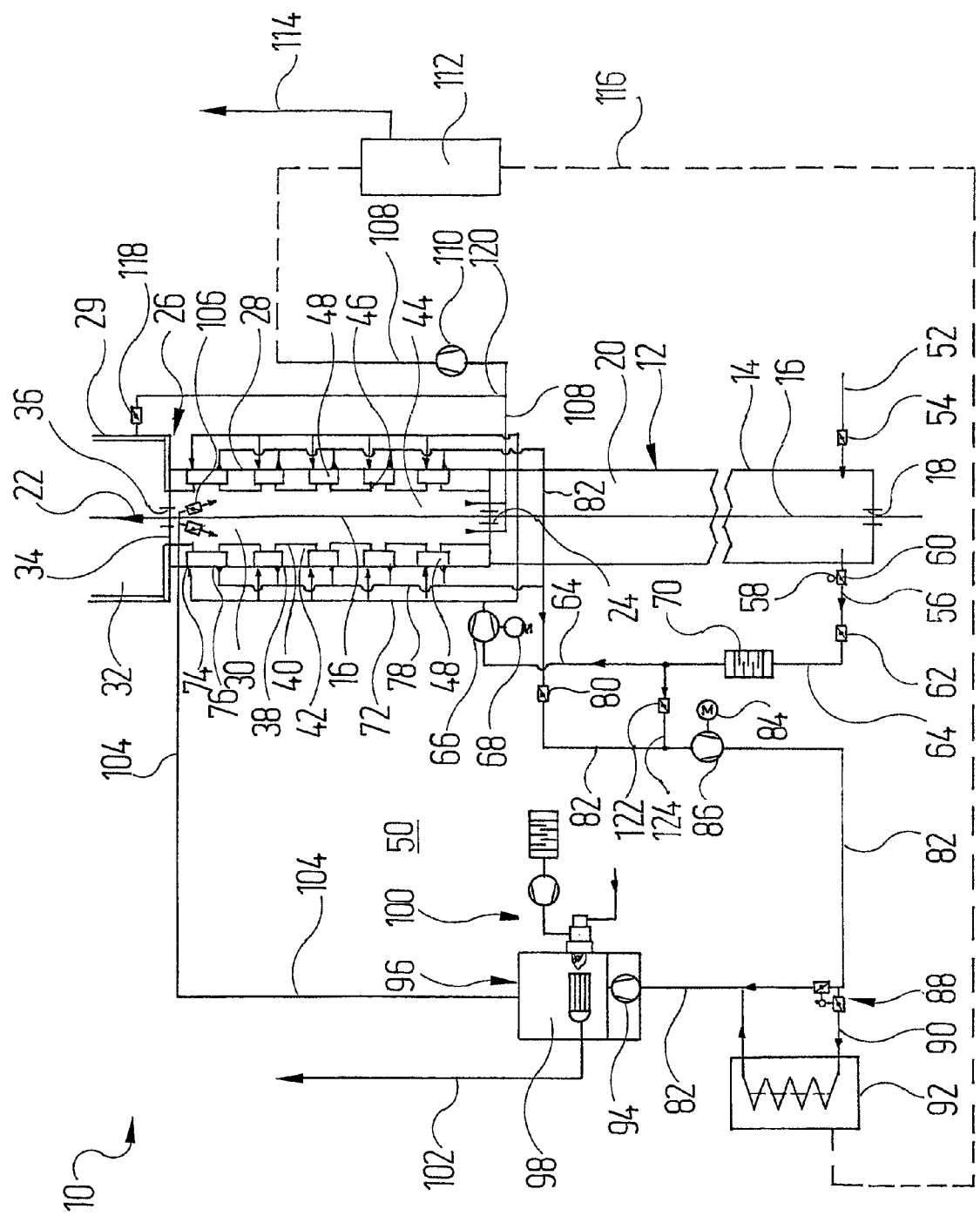

METHOD AND INSTALLATION FOR COATING A METAL STRIP WITH A COATING CONTAINING A SOLVENT AND FOR DRYING AND/OR CROSS-LINKING SAID COATING

RELATED APPLICATIONS

This application claims the filing benefit of International PCT Patent Application No. PCT/EP2005/012989, filed Dec. 5, 2005, which claims the filing benefit of Germany Patent Application No. 10 2004 059 903.3 filed Dec. 13, 2004, the contents of which are incorporated herein by reference.

TECHNICAL FIELD

The present invention relates to a method and apparatus for coating a metal strip with a coating containing a solvent and for drying and/or cross-linking said coating, wherein the metal strip is provided with the coating in the inner chamber of a coating device;

the coated metal strip is conducted through a drying unit, and in an inner chamber of the latter the coated metal strip is exposed to a form of energy by at least one radiation source that is cooled by cooling gas; said form of energy is converted to heat in the coating and/or the metal strip; and a gas is fed in.

In addition the invention relates to an installation for coating a metal strip with a coating containing a solvent and for drying and/or cross-linking said coating, which comprises:

a coating device with a housing, and in an inner chamber of the latter the metal strip is provided with the coating;

a drying unit with a housing, through which the coated metal strip travels;

at least one radiation source that is cooled by cooling gas, which is arranged in the inner chamber of the housing close to the travel path of the metal strip and exposes the metal strip to a form of energy which is converted to heat in the coating and/or the metal strip;

a drying zone gas supply unit, with which gas can be conducted into the inner chamber;

a cooling gas supply unit, with which cooling gas can be fed to the radiation source; and, a cooling gas removal unit, with which cooling gas can be extracted after flowing through the radiation source and absorbing the waste heat from the latter.

BACKGROUND OF THE INVENTION

Coated, especially painted, metal strip has become popular in many industrial sectors. Particularly the fact that metal strip can be stored in a simple manner wound as coil and pre-coated unwound directly from the coil before shaping makes it interesting for many applications.

Meanwhile, methods and installations, which use electromagnetic radiators for drying and/or cross-linking the coating of the metal strip, in particular infrared radiators, are known from DE 101 58 008 A1 for example. Such infrared radiators need cooling, which can be effected by means of a liquid, but also by means of a cooling gas, in particular cooling air, which absorbs the waste heat from the radiation sources.

In such a drying unit the infrared radiation is substantially converted to heat in the coating, whereby the solvent is expelled from the coating within a short time and/or cross-linking of the coating takes place.

The solvent released in the inner chamber of the drying unit must be removed from the latter. For this purpose gas, preferably air, which has previously been brought to a temperature above the condensation temperature of the solvent, is conducted into the inner chamber. This gas absorbs the solvent; both are extracted from the latter at another place in said inner chamber.

Such a drying unit thus has a gas or air supply, wherein overall large volumes of gas are needed, which must be conditioned, more particularly heated, with relatively high consumption of energy.

Conditioned generally means that the gas is treated to meet given requirements within specific parameters such as purity, humidity and temperature, for example.

The present invention is directed to resolving these and other matters.

SUMMARY OF THE INVENTION

An object of the present invention is to refine a method and installation of the kind initially described so that the required volume of gas is minimized overall and the necessary quantity of energy is reduced.

This object may be achieved as regards the method in that the cooling gas that is supplied to the radiation source, after flowing through the radiation source and absorbing the waste heat from the latter, is conducted into the inner chamber of the drying unit.

As a result one and the same gas and thus one and consequently one and the same volume of gas on the one hand can be used to cool the radiation source, and on the other hand can be conducted into the inner chamber of the drying unit, in order to remove solvent released there.

Therefore the total volume of gas is minimized in comparison to the prior art, wherein a first volume of gas had to be used for cooling the radiation sources and a further volume of gas had to be used for the inner chamber of the drying unit, which were separately supplied to the individual components.

The gas, which has flowed through the radiation source for cooling, is inevitably heated up in relation to its temperature when flowing into the radiation source. This means that the energy, already present in the form of waste heat from the radiation source, is used to heat or at least preheat the gas flow before it enters the inner chamber of the drying unit.

Thus the energy demand, which is required to bring the gas to a temperature suitable for the inner chamber of the drying unit, can be reduced.

Expediently the gas conducted into the inner chamber of the drying unit is heated directly before entering the inner chamber, so that its temperature lies above the condensation temperature of the solvent used. If the gas heated up by the radiation source is not at this temperature, the amount of energy required to make it so is still always less than when heating the gas starting from ambient temperature for example.

Preferably, the form of energy is infrared radiation. This has the advantage that the heat results from absorption of the infrared radiation directly in the coating.

In this case it is advantageous if the wavelength of the infrared radiation lies between approximately 0.8 μm and approximately 3.0 μm, in particular between approximately 0.8 μm and approximately 1.5 μm. These are the wavelength ranges in the near infrared spectrum, in which popular solvents and popular coatings have favourable absorption bands.

Air is particularly suitable as the gas.

If the flow through the inner chamber of the coating device is a conditioned gas, the method can be continued with the gas, which has flowed through the inner chamber of the coating device being supplied at least partially as cooling gas to the radiation source.

It has been recognized that the gas, which leaves the inner chamber of the coating device, despite the solvents absorbed by the gas, can be supplied to the radiation sources as cooling gas, without there being danger of the solvent-laden gas igniting when heated up in the radiation sources.

The necessary total volume of gas can be further minimized as a result of this measure.

It is advantageous if the retention period of the metal strip in the drying unit amounts to less than 20 seconds and, even better, less than 2 seconds.

The object described above as regards the device is achieved in that the cooling gas removal unit is connected to the drying zone gas supply unit in such a way that extracted cooling gas can be fed into the drying zone gas supply unit.

The advantages, which can be achieved as a result, correspond analogously to the advantages, described above, of the method according to the invention.

In one embodiment a heat exchanger and/or a burner arrangement are provided on the flow path of the gas from the radiation source to the inner chamber of the drying unit, by means of which the gas can be heated, so that its temperature lies above the condensation temperature of the solvent. Thus, advantageously it is ensured that the gas, if its temperature does not meet the requirements, can be brought to a suitable temperature.

Advantageously, the radiation source is designed to emit infrared radiation, and to be precise expediently in a wavelength range of between approximately 0.8 μm and approximately 3.0 μm, in particular between approximately 0.8 μm and approximately 1.5 μm. Regarding the advantages, reference may be made to the above remarks concerning this radiation and these wavelength ranges.

It is advantageous if the gas is air.

In one embodiment of the installation, wherein the flow through the inner chamber of the coating device is a conditioned gas, an extraction unit is provided, wherein the conditioned gas can be removed from the inner chamber of the coating device and supplied at least partially to the cooling gas supply unit.

Also in this respect, reference may be made to the corresponding advantages mentioned above as regards the method, which apply analogously.

Good regulation of the quantity of cooling gas, which is supplied to the radiation source, can be effected by means of a connector, which can connect the extraction unit to the cooling gas removal unit. Thus, possibly less gas than that coming from the inner chamber of the coating installation can be supplied to the radiation source. Since the diverted gas is fed into the cooling gas removal unit, which transports the gas further to the drying zone gas supply unit, this does not affect the quantity of gas, which is supplied to the inner chamber of the drying unit.

In another advantageous embodiment the housing comprises an outer jacket and an inner jacket, the radiation source being arranged in a niche of the inner jacket. The gap between outer and inner jacket can be used in this case for insulation or cooling purposes. The arrangement of the radiation source in a niche enables a continuous drying tunnel to be formed.

Preferably, at least one radiation source is arranged on both sides of the travel path of the metal strip in the inner chamber of the drying unit. Thus, the coatings on both sides of the metal strip are dried and/or cross-linked with only one passage of the latter through the device.

It is to be understood that the aspects and objects of the present invention described above may be combinable and that other advantages and aspects of the present invention will become apparent upon reading the following description of the drawings and detailed description of the invention.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

An exemplary embodiment of the invention is described below in more detail on the basis of the drawing; the only FIGURE schematically shows a finishing installation 10 viewed from above, in which a metal strip is provided with a coating containing a solvent and this coating is dried and/or cross-linked.

The finishing installation 10 comprises a coating device 12 with a housing 14. A metal strip 16, after previous cleaning, is conducted in vertical alignment through an inlet opening 18 of the housing 14 into the inner chamber 20 of the latter. The direction, in which the metal strip 16 travels is indicated by the arrow 22.

The metal strip 16 is provided by means of known techniques with a coating containing a solvent, in particular paint, in the inner chamber 20 of the coating device 12.

After passing through the coating device 12 the coated metal strip 16 is now conducted through a connection opening 24 into a drying zone 30 of a drying unit 26 adjacent to the coating device 12. The drying zone 30 is enclosed by a housing 28.

A further housing 29 encloses a cooling or flash-off zone 32 of the drying unit 26, which is separated by a partition wall 34 with a passage opening 36 from the drying zone 30.

The housing 28 of the drying zone 30 comprises a lateral outer jacket 38 as well as a lateral inner jacket 40, which delimit a gap 42. Altogether, the housing 28 forms a tunnel-like inner chamber 44, through which the metal strip 16 to be dried travels.

In niches 46 of the inner jacket 40, radiation sources in the form of infrared radiators 48, which are air-cooled in a way described more precisely further below, are installed on both sides of the travel path of the metal strip 16.

The infrared radiators 48 emit radiation, which substantially lies in the wavelength range of the near infrared spectrum, in particular in the wavelength range of approximately 0.8 μm to 3.0 μm and preferably approximately 0.8 μm to approximately 1.5 μm.

This infrared radiation in this case penetrates the coating of the metal strip 16 firstly from the outside inwards, is reflected on the metallic surface of the metal strip 16 and then passes through the coating a second time. A small amount of the infrared radiation is possibly converted to heat in the metal strip 16 or on its surface.

The wavelength of the infrared radiation in this case is matched to the material of the coating in such a way that as far as possible the entire infrared radiation is completely absorbed during the double pass through the coating, so that consequently as little infrared radiation as possible escapes again from the coating after the reflection. The correct wavelength for this can be determined from the absorption bands of the coating material.

After the metal strip 16, treated with infrared radiation, has passed through the drying zone 30 of the drying unit 26, if it has traveled in this way through the passage opening 36 into the cooling or flash-off zone 32, the drying/cross-linking process of the coating is substantially complete. Only very few solvent vapours, which are extracted in a way described more precisely further below, arise in the flash-off zone 32.

The solvent is expelled very rapidly from the coating of the metal strip 16 in the drying zone 30 over a very short distance, which the metal strip 16 must cover for this purpose. The same applies to a subsequent cross-linking process, which takes place at high speed.

The entire drying and/or cross-linking process lasts for less than 20 seconds and can even be complete in less than 2 seconds.

In the finishing installation 10, the inner chamber 20 of the coating device 12, the inner chamber 44 of the drying zone 30 of the drying unit 26 and the infrared radiators 48 are exposed to a gas, in the form of air, for different purposes at different temperatures. In addition, the finishing installation 10 comprises an air supply regulation system 50, which is described below together with its mode of operation.

Solvent vapours are dispersed in the inner chamber 20 of the coating device 12 due to the coating operation, possibly together with surplus coating material. In order to remove these from the coating device 12, conditioned fresh air is supplied to the inner chamber 20 of the latter by way of several inlets 52, only one of which is shown in the drawing for the sake of clarity. Conditioned, as previously mentioned, means that the fresh air is treated in an upstream process to meet requirements of purity, temperature and humidity for example, which such air conducted into the inner chamber of a coating device must fulfil.

The inlets 52 have a regulating flap 54, by means of which the total throughput can be adjusted. Instead of a regulating flap 54 a speed-controlled fan can also be used.

After the fresh air supplied in this way has flowed through the inner chamber 20 of the coating device 12, it is now laden with solvent extracted via several extraction pipes 56, which are distributed along the inner chamber 20 of the coating device 12 and only one of which is shown in the drawing for the sake of clarity. In the flow path through the extraction pipe 56 is a flap 60 controlled by a motor 58, so that the extraction volume capacity can be adjusted along the inner chamber 20.

The extraction pipes 56 discharge into a regulating flap 62 of a collector pipe 64. The collector pipe 64 is connected to a fan 66, which is driven by a motor 68 and which extracts solvent-laden air from the inner chamber 20 of the coating device 12. The extraction pipes 56, the collector pipe 64 and the fan 66 together form an extraction unit.

The extracted air flows through a filter 70, which retains a portion of the solvent and/or the extracted over-spray, on the flow path between the regulating flap 62 and the fan 66.

The fan 66 directs the air, already consumed once in this way, into a distributor pipe 72, through which air is fed in each case to a cooling air inlet of the infrared radiators 48, only one cooling air inlet being provided with reference symbol 74 in the drawing. The fan 66 and the distributor pipe 72 thus form a cooling gas supply unit, wherein the fan 66 serves as a connecting link between the extraction unit 56, 64, 66 mentioned above and the cooling gas supply unit 66, 72.

After the air has flowed through internal channels (not illustrated) of the infrared radiators 48, now heated up by waste heat from the infrared radiators 48 to approx. 70° C.-100° C., in each case via a cooling air outlet of the infrared radiators 48, only one of which is provided with reference symbol 76 in the drawing, said air enters a discharge pipe 78.

This concentrates the cooling air, consumed in this way, into a slightly downstream collector pipe 82 provided with a regulating flap 80. The latter is connected to a fan 86 driven by a motor 84; the discharge pipe 78, the collector pipe 82 and the fan 86 together thus form the cooling gas removal unit.

The air is conducted further by the collector pipe 82 to a flap arrangement 88, through which the air flow can optionally be fed totally or partially via a heat exchanger pipe 90 through a heat exchanger 92 or can by-pass this via the collector pipe 82.

The heat exchanger pipe 90 after passing through the heat exchanger 92 again discharges into the collector pipe 82, which is connected, downstream from this discharge point, to a fan 94, which takes the air through a heating unit 96.

The air at this moment in time should have reached a temperature of approximately 250° C. If the air is cooler, it is brought to this temperature by a burner arrangement 100 of the heating unit 96. Any incineration gases arising are extracted via a discharge pipe 102 from the combustion chamber 98 of the heating device 96.

The hot air at approximately 250° C. is conducted further by the fan 94 to a supply pipe 104, which discharges, by means of regulating flaps 106 close to the passage opening 36 in the partition wall 32 of the drying unit 26, into its inner chamber 44 of the drying zone 30.

The fan 94 and the supply pipe 104 with its regulating flaps 106 thus form a drying zone gas supply unit.

The air, conducted in this way to the inner chamber of the drying zone 30, flows in reverse through the drying zone 30 against the direction in which the metal strip 16 travels, in order to remove solvent, released during the drying/cross-linking process, from the drying zone 30 of the drying unit 26. While flowing through the drying zone 30 of the drying unit 26, the air continues to heat up to approximately 270° C.

Close to the connection opening 24 between the coating device 12 and the drying unit 26, the air is extracted from the latter, after flowing through the drying zone 30 via an extraction pipe 108, which is connected to a fan 110. This extracted air, at a temperature of between approximately 180° and approximately 200° C., is fed to a waste gas purifier, for example a thermal afterburner 112. The hot waste gas purified in this way can then be discharged, either by means of an exhaust air duct 114 into the atmosphere or however, as indicated in the drawing by the broken pipe 116, fed to the heat exchanger 92, in order to bring the air in the heat exchange pipe 90 to the desired temperature.

An extraction pipe 120, connected to the flash-off zone 32 by means of a regulating flap 118, discharges into the extraction pipe 108 upstream from the fan 110. As a result, solvent released from the flash-off zone 32 is extracted from the drying unit 26.

Between the filter 70 and the fan 66 is the collector pipe 64, through which the solvent-laden air flows from the inner chamber 20 of the coating device 12, via a feeder pipe 124, provided with a regulating flap 122, upstream from the fan 86 connected to the collector pipe 82, through which the cooling air consumed by the infrared radiators 48 flows. Thus, the air volume fed to the infrared radiators 48 can be adjusted by partial direct transfer from the collector pipe 64 into the collector pipe 82 depending on the position of the regulating flap 118.

In the finishing installation 10 described above, different functions in different areas of the finishing installation 10 needing an air supply are fulfilled by the same air. With the exemplary embodiment described above, conditioned fresh air is firstly used to expel surplus solvent and possibly coating material from the coating device 12. Afterwards, this air serves to cool the infrared radiators 48 installed in the drying unit 26 and therefore air already consumed twice is finally used to remove solvent, released in the reverse flow, from the drying zone 30 of the drying unit 26.

As a result of this multiple use of a quantity of gas supplied only once to the finishing installation 10, the total volume of gas needed can be reduced in comparison to the prior art in the case of such a finishing installation and the gas used can thus be utilized more efficiently overall.

Also, advantages result with regard to saving of energy. In particular, the cooling gas flow from the infrared radiators 48 is used for preheating the gas, which is conducted into the inner chamber 44 of the drying zone 30 of the drying unit 26. Apart from the volume of gas, this reduces the energy demand, which is normally required to bring gas intended for the inner chamber of a drying zone to a specific temperature.

The temperature of the gas, which is supplied to the inner chamber of the drying zone 30 of the drying unit 26, in this case lies substantially above the condensation temperature of the solvent used.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A method for coating a metal strip with a coating containing a solvent that may be ignited, and for drying and/or cross-linking said coating, wherein
   the metal strip is provided with the coating in an inner chamber of a coating device;
   the coated metal strip is conducted through a drying unit, and in an inner chamber of the latter
      the coated metal strip is exposed to a form of energy by at least one radiation source that is cooled by a cooling gas; said form of energy is converted to heat in the coating and/or the metal strip, and
      a conditioned gas is fed into the inner chamber of the drying unit,
   the method comprising the steps wherein
   the cooling gas that is supplied to the radiation source, after flowing through the radiation source and absorbing the waste heat from the latter, is conducted into the inner chamber of the drying unit,
   and further wherein flowing through the inner chamber of the coating device is the conditioned gas, which has flowed through the inner chamber of the coating device and supplied at least partially as the cooling gas to the radiation source.

2. The method of claim 1, wherein the conditioned gas conducted into the inner chamber of the drying unit is heated directly before entering the inner chamber, so that its temperature lies above the condensation temperature of the solvent.

3. The method of claim 1, wherein the form of energy is infrared radiation.

4. The method of claim 3, wherein the wavelength of the infrared radiation lies between approximately 0.8 μm and approximately 3.0 μm.

5. The method of claim 1, wherein air is used as the conditioned gas.

6. The method of claim 1, wherein the metal strip is conducted through the drying unit in less than 20 seconds.

7. The method of claim 6, wherein the metal strip is conducted through the drying unit in less than 2 seconds.

8. An installation for coating a metal strip with a coating including a solvent and for drying and/or cross-linking said coating, the installation comprises:
   a coating device with a housing, and in an inner chamber of the latter the metal strip is provided with the coating;
   a drying unit with
      a housing, through which the coated metal strip travels;
      at least one radiation source that is cooled by a cooling gas, which is arranged in the inner chamber of the housing close to the travel path of the metal strip and exposes the metal strip to a form of energy which is converted to heat in the coating and/or the metal strip;
      a drying zone gas supply unit; with which a conditioned gas can be conducted into the inner chamber;
      a cooling gas supply unit, with which the cooling gas can be supplied to the radiation source;
      a cooling gas removal unit, with which the cooling gas can be extracted after flowing through the radiation source and absorbing the waste heat from the latter, wherein
   the cooling gas removal unit is connected to the drying zone gas supply unit in such a way that the extracted cooling gas can be fed into the drying zone gas supply unit, and further an extraction unit is provided, wherein the conditioned gas can be removed from the inner chamber of the coating device and supplied at least partially to the cooling gas supply unit.

9. The installation of claim 8, further comprising a heat exchanger and/or a burner arrangement being provided on the flow path of the conditioned gas from the radiation source to the inner chamber of the drying unit, by means of which the conditioned gas can be heated, so that its temperature lies above the condensation temperature of the solvent.

10. The installation of claim 8, wherein the radiation source is designed to emit infrared radiation.

11. The installation according to claim 10, wherein the radiation source is designed to emit radiation with a wavelength of between approximately 0.8 μm and approximately 3.0 μm.

12. The installation of claim 8, wherein the conditioned gas is air.

13. The installation of claim 8, wherein the extraction unit can be connected by means of a connector to the cooling gas removal unit.

14. The installation of claim 8, wherein the housing of the drying unit comprises an outer jacket and an inner jacket and the radiation source is arranged in a niche of the inner jacket.

15. The installation of claim 8, wherein at least one radiation source is arranged on both sides of the travel path of the metal strip in the inner chamber of the drying unit.

* * * * *